UNITED STATES PATENT OFFICE.

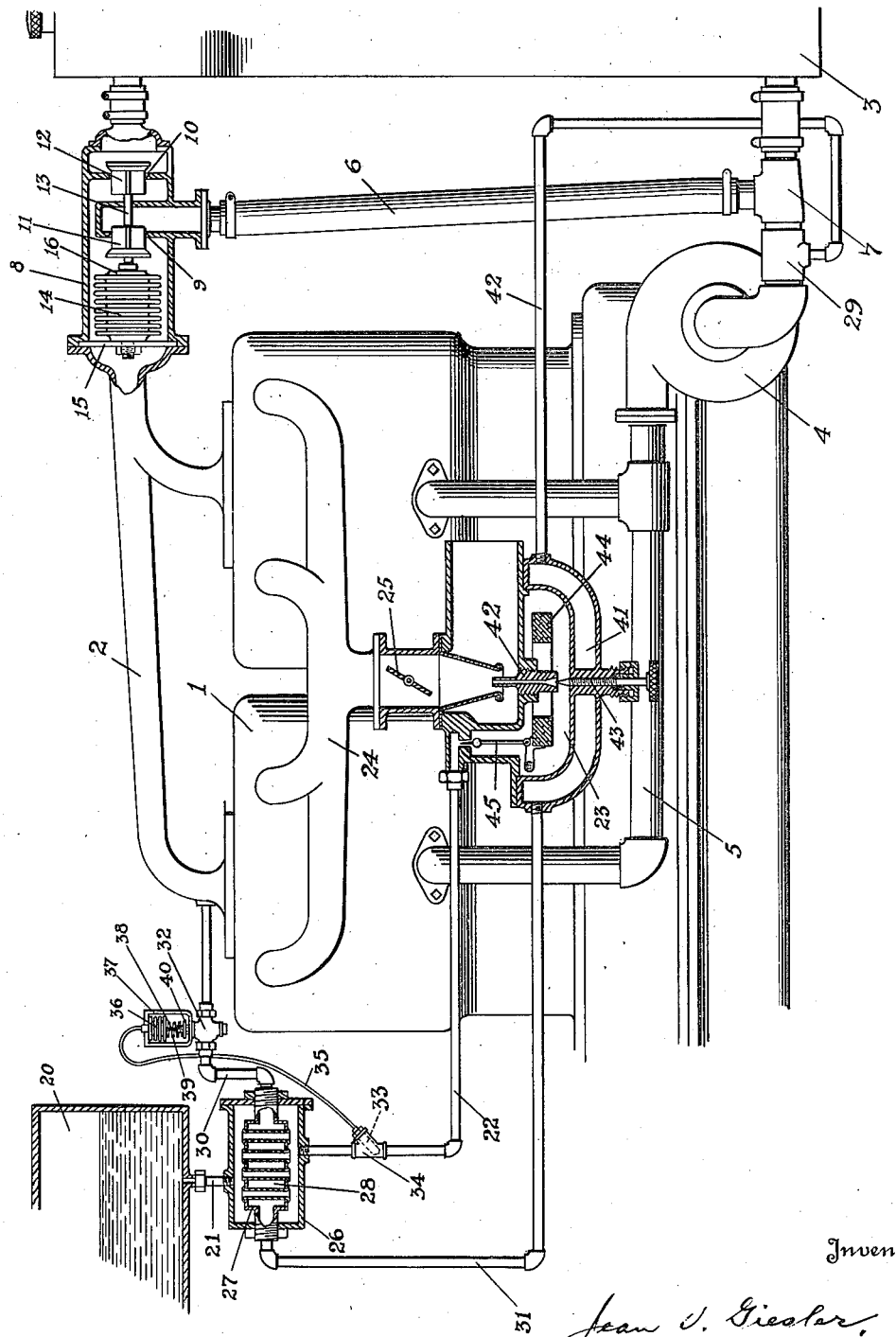
J. V. GIESLER.
FUEL HEATING SYSTEM.
APPLICATION FILED OCT. 24, 1916.
1,318,068.
Patented Oct. 7, 1919.

JEAN V. GIESLER, OF KNOXVILLE, TENNESSEE, ASSIGNOR TO THE FULTON COMPANY, OF KNOXVILLE, TENNESSEE, A CORPORATION OF MAINE.

FUEL-HEATING SYSTEM.

1,318,068.      Specification of Letters Patent.      Patented Oct. 7, 1919.

Application filed October 24, 1916. Serial No. 127,472.

*To all whom it may concern:*

Be it known that I, JEAN V. GIESLER, a citizen of the United States of America, and a resident of Knoxville, Tennessee, have invented a new and useful Improvement in Fuel-Heating Systems, which invention is fully set forth in the following specification.

This invention relates to internal-combustion engines and, while of utility when employed with a variety of engines of this type, is particularly designed as an improvement in internal-combustion engines wherein a cooling medium is circulated in operative or heat-interchanging relation therewith. This invention, in certain respects, is a modified embodiment of the generic invention disclosed and claimed in my Patent No. 1,300,600, granted April 15, 1919, and in certain respects is an improvement over the specific embodiment disclosed in said patent.

As pointed out in said patent systems heretofore devised for preheating fuel prior to its delivery to the engine cylinders have had serious defects, rather the more notable of which was the lack of control or uniformity in the heating of such fuel.

It is an object of this invention to provide a fuel heating system for an internal-combustion engine wherein the temperature of the fuel is maintained substantially constant. A further object of the invention is to provide a system of the type characterized with means to prevent over-heating of the fuel and, therefore, to prevent any likelihood of the liquid fuel boiling before delivery to the point at which vaporization is designed to take place. Yet another object of this invention is to provide a fuel heating system for internal-combustion engines which enables the use of low grade fuels, which increases the efficiency of the engine by supplying to the fuel heat that has heretofore been lost, and which is simple in construction, inexpensive to install, and efficient in operation.

Stated briefly, the invention comprises, in combination with an internal-combustion engine, means for supplying fuel thereto, and means for preheating said fuel prior to its delivery to the engine, said last-named means preferably comprising a by-pass in the system for circulating a cooling medium in operative or heat-interchanging relation to the engine, and comprising a separate heater for the liquid fuel, or a heating jacket for the fuel reservoir of the carbureter, or both, as may be desired. In accordance with this invention, thermosensitive means are provided for maintaining the heating medium at a substantially uniform temperature and for regulating the flow of said heating medium through the means for preheating the fuel, said last-named thermosensitive means being controlled by the temperature of said fuel. Where the means for preheating the fuel comprises a by-pass in a system for circulating a cooling medium in operative relation to the engine, the first-named thermosensitive means may take the form of means for regulating the flow of the cooling medium through the system.

The invention is susceptible of embodiment in a variety of mechanical expressions, one of which for purposes of illustration has been shown on the accompanying drawing, but it is to be expressly understood that this embodiment has been selected for purposes of illustration only, and is not to be construed as definitive of the limits of the invention, reference being had to the appended claims for that purpose.

Referring to the drawing, the same illustrates in elevation, partly in section, one embodiment of the present invention.

In the form shown, 1 is an internal-combustion engine of any preferred type, the same being provided with a jacket or jackets through which it is designed a cooling medium shall be circulated in heat-interchanging relation to the engine cylinder or cylinders. 2 represents the manifold through which the cooling medium flows from the engine jackets, 3 any suitable form of radiator, 4 any suitable form of circulating pump for withdrawing the cooling medium from the radiator and delivering the same to the engine jackets, and 5 the manifold through which the cooling medium returns to said jackets. While the invention has been illustrated as embodied in a system for circulating a cooling medium employing a circulating pump, it will be understood that the invention may be embodied with equal facility in a system employing the thermo-siphon principle of circulation.

Means are provided for controlling the temperature of the cooling medium, such preferably taking the form of means for regulating the flow of said medium through the system. While any suitable form of thermostatically controlled device for regulating the cooling of said medium may be employed, the illustrated embodiment of the invention comprises a by-pass 6 between the manifold 2 and the conduit 7 intermediate the radiator and the circulating pump, and means for controlling the flow of said cooling medium through either the radiator or the by-pass, or both, as the temperature needs of the cooling medium may determine. In the form shown a valve-housing 8 is provided intermediate the manifold 2 and the radiator 3, from which valve-housing leads the by-pass 6. Within the valve-housing 8 are provided two ports 9 and 10 controlled by valve members 11 and 12 respectively. The port 9 with its valve member 11 controls the flow of cooling medium from the valve-housing into the by-pass 6, while port 10 with its valve member 12 controls the flow of cooling medium from the valve-housing into the radiator 3. Said valve members 11 and 12 may be of any suitable type, being illustrated as well-known forms of seating valves, and are preferably connected by an integral valve-stem 13 whereby they are caused to move in unison. Said valve members are under the control of thermosensitive means of any suitable construction, said thermosensitive means preferably being subjected to the temperature of the cooling medium whereby the proportionate flow through said radiator and by-pass is directly determined by the temperature of this medium. To this end an extensible and contractible vessel 14, preferably constructed of corrugated resilient metal, such as brass, is shown as rigidly mounted at one end by the bracket member 15 in the valve housing 8, and has at its opposite end a movable end wall 16 connected with the valve members 11 and 12. Said vessel 14 is charged with a thermosensitive fluid preferably at a pressure below that to which the vessel is normally exteriorly subjected, whereby under normal working conditions said vessel is somewhat contracted by the exterior pressure thereon. Vessel 14 when expanded to its utmost limit closes valve 11 and opens valve 12. Should vessel 14 leak, the pressure within and without the same becomes equalized, and the resiliency inherent in the same will cause expansion of the vessel to its utmost limit, therefore closing valve 11 and opening valve 12.

Any suitable means for supplying fuel to the engine may be employed. On the embodiment illustrated in the drawing, 20 represents a fuel supply tank. This tank may be either the main storage tank used in connection with a gravity supply system, or it may be an intermediate tank of any suitable form in vacuum or pressure fuel feed system. From tank 20 the fuel is supplied to the engine cylinders through pipes 21, 22, carbureter 23 and intake manifold 24, any suitable form of throttle valve being employed intermediate the carbureter and intake manifold, as illustrated at 25. In accordance with one embodiment of this invention, a heater for the fuel is interposed between the pipes 21 and 22. Any suitable form of heater may be employed, the illustrated construction comprising a casing 26 within which is positioned a second casing 27 intersected by a plurality of tubes 28. The fuel may pass around the exterior of the casing 27 as well as through the tubes 28.

Means are provided for supplying a heating medium to said heater, said heating medium preferably being the cooling medium circulated in operative or heat-interchanging relation to the engine and in its heated condition as it leaves the engine jackets. To this end a by-pass is provided, in the form shown, intermediate the manifold 2 and the inlet 29 of the circulating pump, said by-pass being shown as comprising a pipe 30 communicating at one end with the manifold 2 and at its opposite end with the interior of the casing 27, and a second pipe 31 communicating at one end with the interior of the casing 27 and at its opposite end with the intake of the circulating pump. Thereby cooling medium in its heated condition as it flows from operative or heat-interchanging relation to the engine passes through the casing 27, surrounding the tubes 28 and delivering its heat to the fuel as it passes through said tubes and around the exterior of the casing 27. From the latter casing the cooling medium returns to the circulating pump 4.

Under normal working conditions the temperature of the cooling medium flowing through the system will be maintained substantially constant, whereby the fuel will be preheated to a substantially constant temperature before it is supplied to the carbureter. To positively prevent over-heating of the fuel under abnormal conditions, and to positively control the maximum temperature to which the fuel shall be preheated, whether the same be above or below the normal temperature of the cooling medium, means are provided for controlling the flow of the heating medium through the by-pass heretofore described, such means preferably taking the form of a thermosensitively controlled valve the thermosensitive member of which is subjected to the temperature of the fuel. In the embodiment illustrated on the drawing, a valve casing 32 is interposed in the by-pass between two sections of the pipe 30, and thermosensitive means of any suitable construction are provided for controlling said valve. Said thermosensitive means as shown comprises a bulb 33 carried by and projecting into the interior of a Y-coupling 34 interposed between two sections of the pipe 22, said bulb 33 being in communication through a conduit 35 with an extensible and contractible vessel 36, preferably made of corrugated resilient material, such as brass. Vessel 36 is fixedly supported at one end by the bracket member 37 carried by the valve-housing 32, and has at its opposite end a movable end wall connected with the valve stem 38. If desired, a spring 39 may be interposed between said movable end wall and an adjustable collar 40 carried by the bracket member 37, whereby, by the adjustment of said collar, an initial tension may be imposed by the spring upon said movable end wall. Bulb 33, conduit 35 and vessel 36 are charged with a thermosensitive fluid. Bulb 33 being subjected to the temperature of the fuel as it flows in its liquid condition from the heater to the carbureter, an increase in temperature of the fuel is accompanied by an increase in pressure within the thermosensitive device comprising said bulb, conduit and vessel, and a consequent increase in pressure on the movable end wall of the vessel. When said pressure is sufficient to overcome the tension of the spring 39, valve stem 38 is actuated by said movable end wall to close the valve within the casing 32.

If desired, the heater for the fuel in its liquid condition may be a jacket for the carbureter, or a jacket for the carbureter may be used in conjunction with a heater as heretofore described. In the embodiment illustrated in the drawing, carbureter 23 is shown as provided with a jacket 41 in communication with the pipe 31 at one side, and in communication through pipe 42 with the intake of the pump 4 at its other side. It will be obvious that pipe 31 may communicate directly with the manifold 2, if desired, when a heating jacket for the carbureter is employed alone, or, as illustrated on the drawing, it may communicate with a heater of the type illustrated at 26, 27 and 28. It will also be apparent that in the former case the bulb 33 of the thermosensitive device would be re-positioned to be subjected to the temperature of the fuel in its heated condition. It is also to be expressly understood that any suitable form of carbureter may be employed, the type illustrated in the drawing, comprising the nozzle 42, needle valve 43, float 44 and float-controlled admission valve 45, being selected for purposes of illustration only and not being essential in any respect to this invention.

In operation, fuel is supplied to the engine cylinder or cylinders from tank 20, flowing through pipes 21 and 22, to the carbureter 23 and thence through the intake manifold 24 into the engine cylinders. When the engine is first started, the cooling medium flowing through the engine cylinders will be relatively cold, vessel 14 will be contracted, valve 11 will be wide open, and valve 12 entirely closed. The cooling medium will flow from manifold 2 through by-pass 6 back to the jackets. As the temperature of the engine rises, the temperature of the cooling medium will correspondingly rise and eventually vessel 14 will begin to expand, proportionately closing valve 11 and opening valve 12, whereby some of the cooling medium will be passed through the radiator 3. Vessel 14 will thereafter move valves 11 and 12 to proportion the flow of cooling medium through the radiator and by-pass so as to maintain a substantially uniform temperature of said cooling medium. Some of the cooling medium in its heated condition, as it flows from operative or heat-interchanging relation to the engine, will flow through the by-pass provided by pipe 30, casing 27, pipe 31, and carbureter jacket 41 when the same is employed, back to the main circulating system as illustrated. This medium, as it flows through the casing 27 or the carbureter jacket 41, or both, will give up some of its heat to the fuel as it passes around casing 27 and through the tubes 28 or through the carbureter jacket, or both, as the case may be. When the temperature of the fuel begins to rise, pressure will be created in the thermosensitive device comprising the bulb 33, conduit 35 and vessel 36, owing to the subjection of the first of these elements to the temperature of the fuel after it leaves the heating means. The pressure created in the thermosensitive device will tend to move the movable end wall of said vessel 36, but said tendency will be opposed by the spring 39. When the temperature of the fuel has reached a predetermined degree, which will be determined by previous adjustment of the spring 39, the pressure created within the thermosensitive device will be sufficient to overcome the tension of said spring, whereupon the movable end wall of the vessel 36 will actuate the valve stem 38 to close the valve within the casing 32 and prevent further circulation of heating medium through the by-pass heretofore described. It will be apparent that spring 39 may be adjusted, to predetermine the temperature at which the valve controlling the flow of the heating medium through the by-pass shall close, to the end of preventing overheating of the fuel in case the medium flowing through the cooling system is insufficiently cooled in the radiator, or it may be adjusted to close the by-pass upon the fuel reaching a predetermined temperature which is less than that to which it would rise were it continuously subjected to the heating medium at its normal temperature.

While this invention has been described as embodied in a system employing a cooling medium for the engine cylinders as a heating medium for the fuel, it will be understood that the invention in all its features is not restricted to such an embodiment, but that certain features thereof are of equal utility when applied to the use of the exhaust gases of the engine as a heating medium for the fuel. The invention is accordingly not to be restricted to the embodiment illustrated on the drawing, as other embodiments, modifications and variations will readily suggest themselves to those skilled in the art, while certain features are susceptible of use without other features thereof. Therefore, the limits of the invention are to be determined by reference to the claims hereto appended.

What is claimed is:

1. In combination with an internal-combustion engine, a heater for the fuel thereof, a system for circulating a cooling medium in heat-interchanging relation to said engine, a by-pass including said heater and through which said medium in its heated condition is passed, thermosensitive means for regulating the flow of cooling medium through said system, and thermosensitive means controlled by the temperature of the fuel for regulating the flow of said medium through said by-pass.

2. In combination with an internal-combustion engine, a heater for the fuel thereof, a system for circulating a cooling medium in heat-interchanging relation to said engine and through said heater, thermostatically controlled means for regulating the cooling of said medium whereby to maintain the same at a substantially uniform temperature, and thermosensitive means controlled by the temperature of the fuel for regulating the flow of said medium through said heater.

3. In combination with an internal-combustion engine and its carbureter, a jacket for said carbureter, a system for circulating a cooling medium in heat-interchanging relation to said engine, a by-pass including said carbureter-jacket and through which said medium in its heated condition is passed, thermosensitive means for regulating the flow of cooling medium through said system, and thermosensitive means controlled by the temperature of the fuel for regulating the flow of said medium through said by-pass.

4. In combination with an internal-combustion engine and its carbureter, a jacket for said carbureter, a system for circulating a cooling medium in heat-interchanging relation to said engine and through said carbureter jacket, thermostatically controlled means for regulating the cooling of said medium whereby to maintain the same at a substantially uniform temperature, and thermosensitive means controlled by the temperature of the fuel for regulating the flow of said medium through said carbureter jacket.

5. In combination with an internal-combustion engine and its carbureter, a jacket for said carbureter, a heater for the fuel of said engine, a system for circulating a cooling medium in heat-interchanging relation to said engine, a by-pass including said carbureter-jacket and heater and through which said medium in its heated condition is passed, thermosensitive means for regulating the flow of cooling medium through said system, and thermosensitive means controlled by the temperature of the fuel for regulating the flow of said medium through said by-pass.

6. In combination with an internal-combustion engine and its carbureter, a jacket for said carbureter, a heater for the fuel of said engine, a system for circulating a cooling medium in heat-interchanging relation to said engine, a by-pass including said carbureter-jacket and heater and through which said medium in its heated condition is passed, and thermosensitive means controlled by the temperature of the fuel for regulating the flow of said medium through said by-pass.

7. In combination with an internal-combustion engine and its carbureter, a jacket for the fuel reservoir of said carbureter, a heater for the fuel of said engine, means for circulating a heating medium through said heater and carbureter-jacket, means controlling the flow of heating medium through said heater and carbureter jacket, and means automatically controlled by the temperature of the fuel for operating said controlling means.

8. In combination with an internal-combustion engine and its carbureter, a jacket for said carbureter, a heater for the fuel of said engine, a system for circulating a cooling medium in heat-interchanging relation to said engine and through said carbureter jacket and heater, thermostatically controlled means for regulating the cooling of said medium whereby to maintain the same at a substantially uniform temperature, and thermosensitive means controlled by the temperature of the fuel for regulating the flow of said medium through said carbureter jacket and heater.

9. In combination with an internal combustion engine, a heater for the fuel thereof, means for circulating a heating medium through said heater, means for maintaining said heating medium at a substantially uniform temperature, means controlling the flow of heating medium through said heater, and means automatically controlled by the temperature of the fuel for operating said controlling means.

10. In combination with an internal-combustion engine and its carbureter, a jacket for the carbureter, means for circulating a heating medium through said carbureter jacket, means for maintaining said heating medium at a substantially uniform temperature, means controlling the flow of heating medium through said carbureter jacket, and means automatically controlled by the temperature of the fuel for operating said controlling means.

11. In combination with an internal-combustion engine, means for supplying said engine with fuel, means for circulating a heating medium in heat-interchanging relation with said fuel, means for maintaining said heating medium at a substantially uniform temperature, means controlling the flow of heating medium in heat-interchanging relation with the fuel, and means automatically controlled by the temperature of the fuel for operating said controlling means.

In testimony whereof I have signed this specification.

JEAN V. GIESLER.